United States Patent
Keung et al.

(10) Patent No.: US 11,575,616 B2
(45) Date of Patent: Feb. 7, 2023

(54) PACKET FORWARDING DEVICE AND QUEUE MANAGEMENT METHOD

(71) Applicant: Cortina Access, Inc., San Jose, CA (US)

(72) Inventors: Donggun Keung, San Jose, CA (US); Charles Chen, San Jose, CA (US)

(73) Assignee: REALTEK SINGAPORE PTE LTD., Singapore (SG)

( * ) Notice: Subject to any disclaimer, the term of this patent is extended or adjusted under 35 U.S.C. 154(b) by 0 days.

(21) Appl. No.: 17/302,145

(22) Filed: Apr. 26, 2021

(65) Prior Publication Data

US 2022/0345416 A1    Oct. 27, 2022

(51) Int. Cl.
| | |
|---|---|
| *H04L 47/32* | (2022.01) |
| *H04L 49/9047* | (2022.01) |
| *H04L 47/30* | (2022.01) |
| *H04L 47/24* | (2022.01) |
| *H04L 47/11* | (2022.01) |

(52) U.S. Cl.
CPC .............. *H04L 47/32* (2013.01); *H04L 47/11* (2013.01); *H04L 47/24* (2013.01); *H04L 47/30* (2013.01); *H04L 49/9047* (2013.01)

(58) Field of Classification Search
CPC ......... H04L 47/32; H04L 47/11; H04L 47/24; H04L 47/30
See application file for complete search history.

(56) References Cited

U.S. PATENT DOCUMENTS

| | | | |
|---|---|---|---|
| 7,730,238 B1 * | 6/2010 | Arulambalam .. | G11B 20/10527 710/52 |
| 2012/0275464 A1 * | 11/2012 | Voruganti ............... | H04L 49/90 370/412 |
| 2021/0021545 A1 | 1/2021 | Srivastava et al. | |

FOREIGN PATENT DOCUMENTS

| | | |
|---|---|---|
| CN | 110557432 A | 12/2019 |
| CN | 110891023 A | 3/2020 |
| TW | I703840 B | 9/2020 |

OTHER PUBLICATIONS

Bridges and Bridged Networks, IEEE Std. 802.1Q-2014.(relevant sections: 6.5.9 Priority(pp. 68-69); 6.9.3 Priority Code Point encoding(pp. 75-76); 8.6.7 Queue management(pp. 126-127); I.2 Managing latency and throughput(p. 1712).
On Queuing, Marking, and Dropping, F. Baker et al.,IETF RFC 7806, Apr. 2016.
Recommendations on Queue Management and Congestion Avoidance in the Internet, B. Braden et al., IETF RFC 2309, Apr. 1998.

* cited by examiner

*Primary Examiner* — Siming Liu
(74) *Attorney, Agent, or Firm* — McClure, Qualey & Rodack, LLP

(57) ABSTRACT

A packet forwarding device and a queue management method are provided. The queue management method is applicable to a plurality of priority queues each associated with a different transmission priority. The queue management method includes: allocating at least one buffer from a free buffer pool to each of the priority queues; monitoring a number of dropped packets of an observation queue of the priority queues; and increasing a number of buffers for the observation queue and decreasing a number of buffers for at least one of the priority queues which has a lower transmission priority than the observation queue, according to the number of dropped packets.

15 Claims, 4 Drawing Sheets

PACKET FORWARDING DEVICE AND QUEUE MANAGEMENT METHOD

BACKGROUND

Technical Field

The present invention relates to a queue management technology, and in particular, to a packet forwarding device and a queue management method.

Related Art

An existing gateway has a plurality of output ports. Each of the output ports corresponds to a plurality of queues each having a different priority to buffer and store packets. If a large number of buffers are provided for each queue, queue congestion can be avoided, but a lot of hardware costs are consumed.

SUMMARY

An embodiment of the present invention provides a packet forwarding device, which includes at least one receiving port, at least one output port, a memory circuit, a forwarding circuit, and a queue management circuit. The receiving port is configured to receive a packet. The memory circuit includes a free buffer pool and a plurality of priority queues. The priority queues correspond to the at least one output port, and the priority queues corresponding to the same output port each are associated with a different transmission priority. The forwarding circuit is configured to store the packet in a target queue of the priority queues to drop the packet in response to the target queue being congested and to store the packet in response to the target queue being not congested. The queue management circuit is configured to allocate at least one buffer from the free buffer pool to each of the priority queues, monitor a number of dropped packets of an observation queue of the priority queues, and increase a number of buffers for the observation queue and decrease a number of buffers for at least one of the priority queues which has a lower transmission priority than the observation queue, according to the number of the dropped packets.

An embodiment of the present invention provides a queue management method, applicable to a plurality of priority queues. The priority queues each are associated with a different transmission priority. The queue management method includes: allocating at least one buffer from a free buffer pool to each of the priority queues; monitoring a number of dropped packets of an observation queue of the priority queues; and increasing a number of buffers for the observation queue and decreasing a number of buffers for at least one of the priority queues which has a lower transmission priority than the observation queue, according to the number of the dropped packets.

In conclusion, the packet forwarding device and the queue management method provided in some embodiments of the present invention can dynamically adjust the number of buffers for the queues in view of limited buffer memory resources, thereby providing an optimized throughput and optimized service quality.

DETAILED DESCRIPTION

Figure 1:
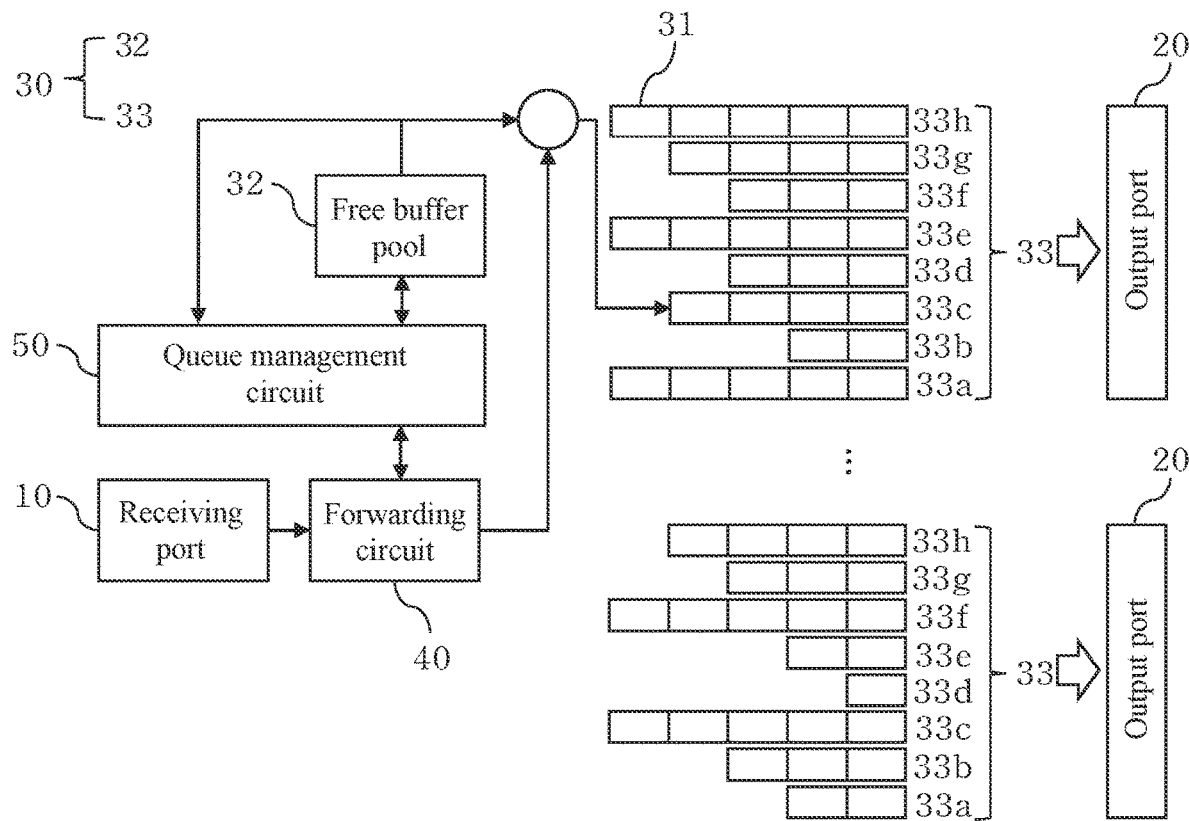
FIG. 1 is a schematic diagram of a packet forwarding device according to an embodiment of the present invention.

FIG. 1 is a schematic diagram of a packet forwarding device according to an embodiment of the present invention. The packet forwarding device includes at least one receiving port 10, at least one output port 20, a memory circuit 30, a forwarding circuit 40, and a queue management circuit 50. The receiving port 10 is configured to receive a packet. The memory circuit 30 includes a free buffer pool 32 and a plurality of priority queues 33. The free buffer pool 32 includes a plurality of buffers (not shown). A size of each of the buffers is not less than a size of the packet to ensure that the packet can be completely stored. For example, there is one receiving port 10 and eight output ports 20 herein. The priority queues 33 correspond to the at least one output port 20. Priority queues 33 corresponding to the same output port 20 each are associated with a different transmission priority. For example, herein, FIG. 1 includes eight priority queues 33 having transmission priorities numbered as 33a-33h in descending order. The forwarding circuit 40 is configured to store the packet in a priority queue 33 (which is referred to as a "target queue" below) of an output port 20 (which is referred to as a "target output port"). The forwarding circuit 40 drops the packet in response to the target queue being congested and stores the packet in the target queue in response to the target queue being not congested.

In some embodiments, the target output port and the target queue are determined through information extracted from a header of the packet.

In some embodiments, a process of storing the packet in the target queue includes the following steps: First, a buffer is allocated from the free buffer pool 32. Next, the packet is moved to the buffer. In addition, the target output port and the target queue of the packet are determined so that the packet is enqueued into the target queue of the target output port. After the packet is stored in the target queue, the packet may be dequeued according to an output schedule and outputted from the target output port. The packet forwarding device further includes an output scheduler (not shown) configured to execute the output schedule.

Figure 2:
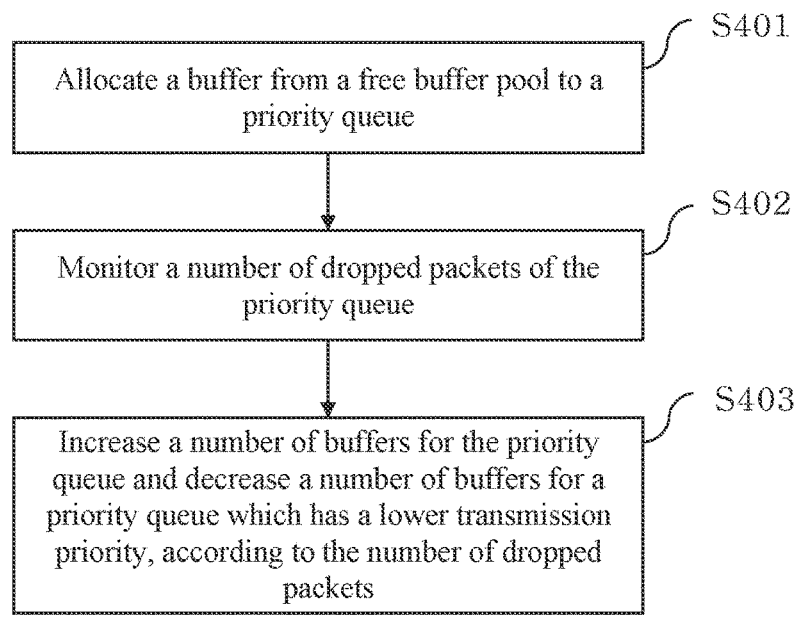
FIG. 2 is a flowchart of a queue management method according to an embodiment of the present invention.

The queue management circuit 50 executes the queue management method. FIG. 2 is a flowchart of a queue management method according to an embodiment of the present invention. The queue management method is applicable to each output port 20. First, at least one buffer 31 is allocated from the free buffer pool 32 to each of the priority queues 33 (step S401). As shown in FIG. 1, each of the priority queues 33 has at least one buffer 31. In step S402, numbers of dropped packets of the priority queues 33 are monitored. In step S403, a to-be-increased number of buffers 31 are taken from the free buffer pool 32 according to the number of dropped packets to increase a number of buffers 31 for a congested priority queue 33. In this way, the priority queue 33 from which the packets are dropped as a result of insufficient buffers 31 can have sufficient buffers 31 to store the packets. In addition, in step S403, a number of buffers 31 is further decreased for a priority queue 33 which has a lower transmission priority than the congested priority queue 33, so as to recycle the redundant buffers 31 to the free buffer pool 32, thereby providing the buffers 31 to the priority queue 33 for which the number of buffers 31 needs to be increased.

In some embodiments, an adjustment range of the number of buffers 31 has an upper limit.

Figure 3:
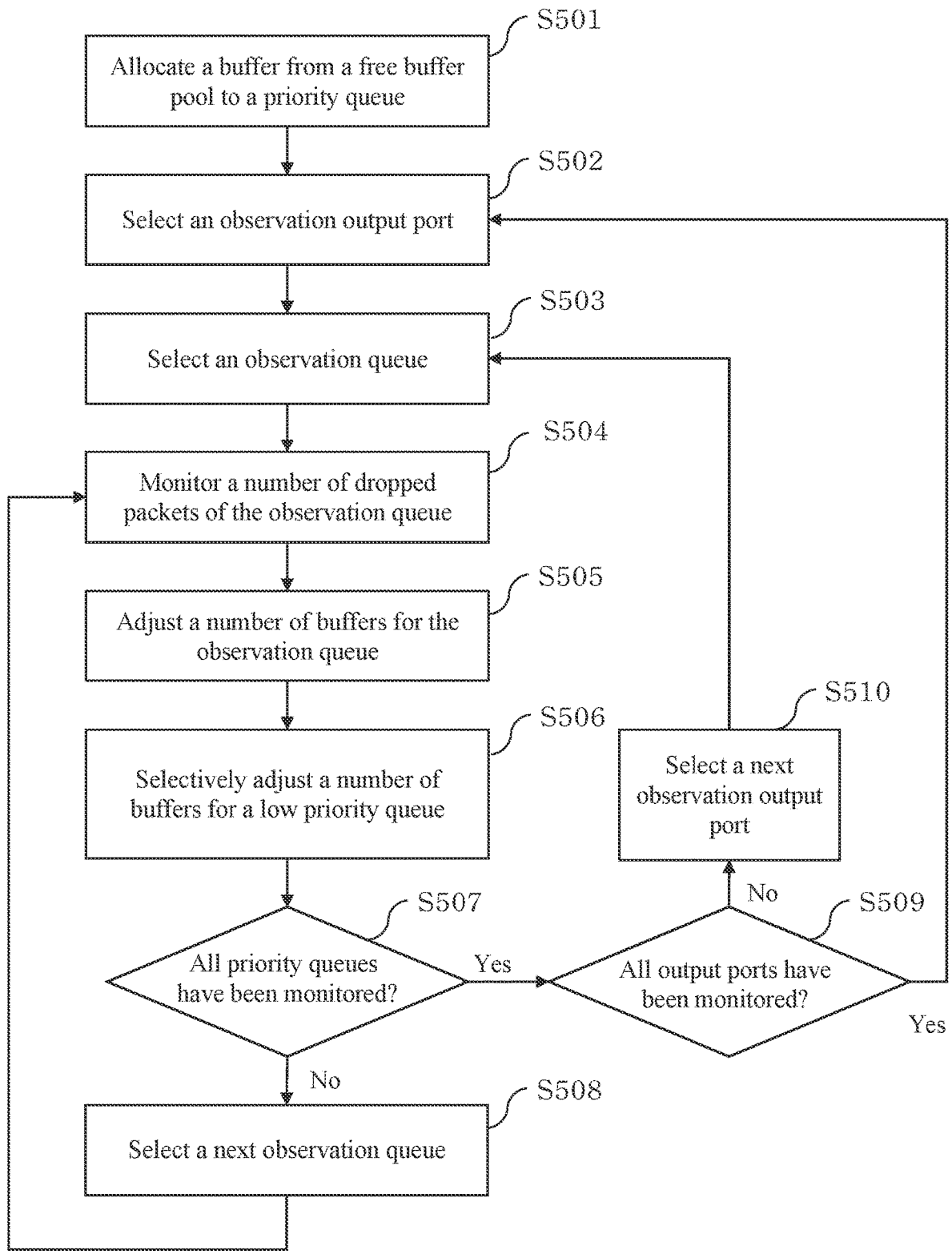
FIG. 3 is a flowchart of a queue management method according to another embodiment of the present invention.

FIG. 3 is a flowchart of a queue management method according to another embodiment of the present invention. In step S501, similar to the above step S401, at least one buffer 31 is allocated from the free buffer pool 32 to each of the priority queues 33. In step S502, one of one or more output ports 20 is selected as an observation output port. Then, one of a plurality of priority queues 33 of the observation output port is selected as the observation queue (step S503). In step S504, a number of dropped packets of the observation queue of the observation output port is monitored (for ease of explanation, an observation queue mentioned later refers to the observation queue of the observation output port). Then, in step S505, the number of buffers 31 is adjusted for the observation queue. In step S506, a number of buffers 31 is selectively adjusted for a priority queue 33 (which is referred to as a "low priority queue" below) which has a lower transmission priority than the observation queue. For example, if the priority queue 33c is used as the observation queue, the low priority queue includes the priority queues 33d-33h. Details of steps S505 and S506 are described later. In step S507, it is determined whether all of the priority queues 33 have been monitored, that is, it is determined whether there are other priority queues 33 that are not used as the observation queue. If not all of the priority queues 33 have been monitored, the process proceeds to step S508 to select another unmonitored priority queue 33 as the observation queue. If all of the priority queues 33 have been monitored, the process proceeds to step S509 to determine whether all output ports 20 have been monitored, that is, determine whether there are other output ports 20 that are not used as the observation output port. If not all of the output ports 20 have been monitored, the process proceeds to step S510 to select another unmonitored output port 20 as the observation output port. If all of the output ports 20 have been monitored, the process returns to step S502 to perform a new monitoring cycle. In this way, priority queues 33 of each of the output ports 20 are continuously monitored to determine whether the priority queues are congested, thereby adjusting a number of buffers 31 accordingly.

In some embodiments, the priority queues 33 are sequentially selected as the observation queue according to an order of transmission priorities.

Figure 4:
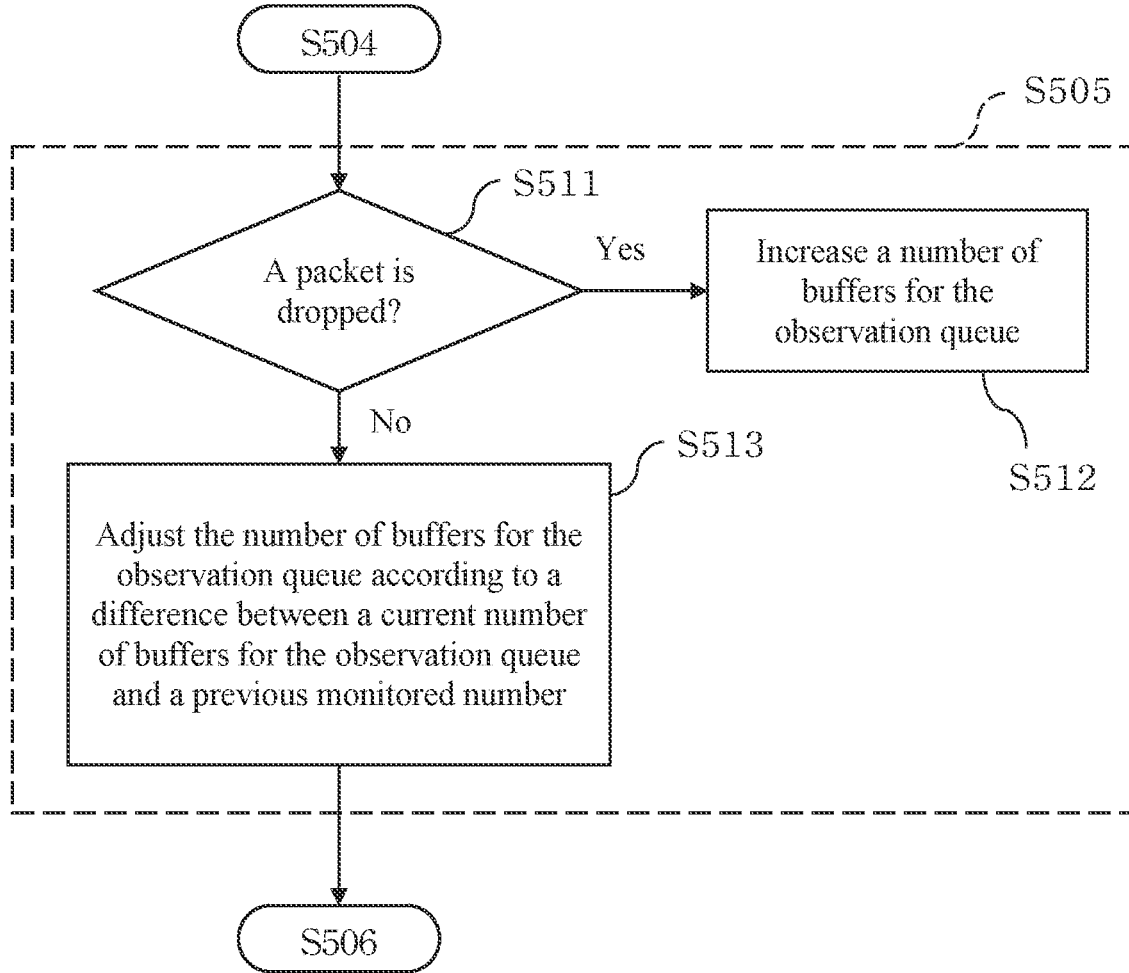
FIG. 4 is a detailed flowchart of step S505 in FIG. 3 according to an embodiment of the present invention.

Next, how to adjust the number of buffers 31 for the observation queue is described. FIG. 4 is a detailed flowchart of step S505 in FIG. 3 according to an embodiment of the present invention. First, it is determined whether packets are dropped from the observation queue (step S511), that is, whether the number of dropped packets is greater than zero. If packets are dropped (the number of dropped packets is greater than zero), the process proceeds to step S512 to increase the number of buffers 31 for the observation queue. In some embodiments, the buffers 31 are increased by the number of dropped packets. In some embodiments, the number of dropped packets is used as a base, and the buffers 31 are increased by an integer multiple of the base. In other words, the buffers 31 are increased for the observation queue by a number equivalent to at least one times the number of dropped packets. If no packet is dropped, the process proceeds to step S513 to adjust the number of buffers 31 for the observation queue according to a difference between a current number of buffers 31 for the observation queue and a previous monitored number (in a previous cycle). In other words, the number of buffers 31 is increased (or decreased) for the observation queue according to whether the number of buffers 31 is increased for the observation queue in a current monitoring cycle (or decreased) compared with the number of buffers 31 of the observation queue in the previous monitoring cycle. In other words, the number by which the buffers 31 are increased (or decreased) is used as a base, and the buffers 31 are increased (or decreased) by a number at least twice the base. Therefore, when there is no congestion, the number of buffers 31 may be dynamically adjusted according to a packet flow.

In some embodiments, if no packets are dropped, the number of buffers 31 is not adjusted for the observation queue.

Figure 5:
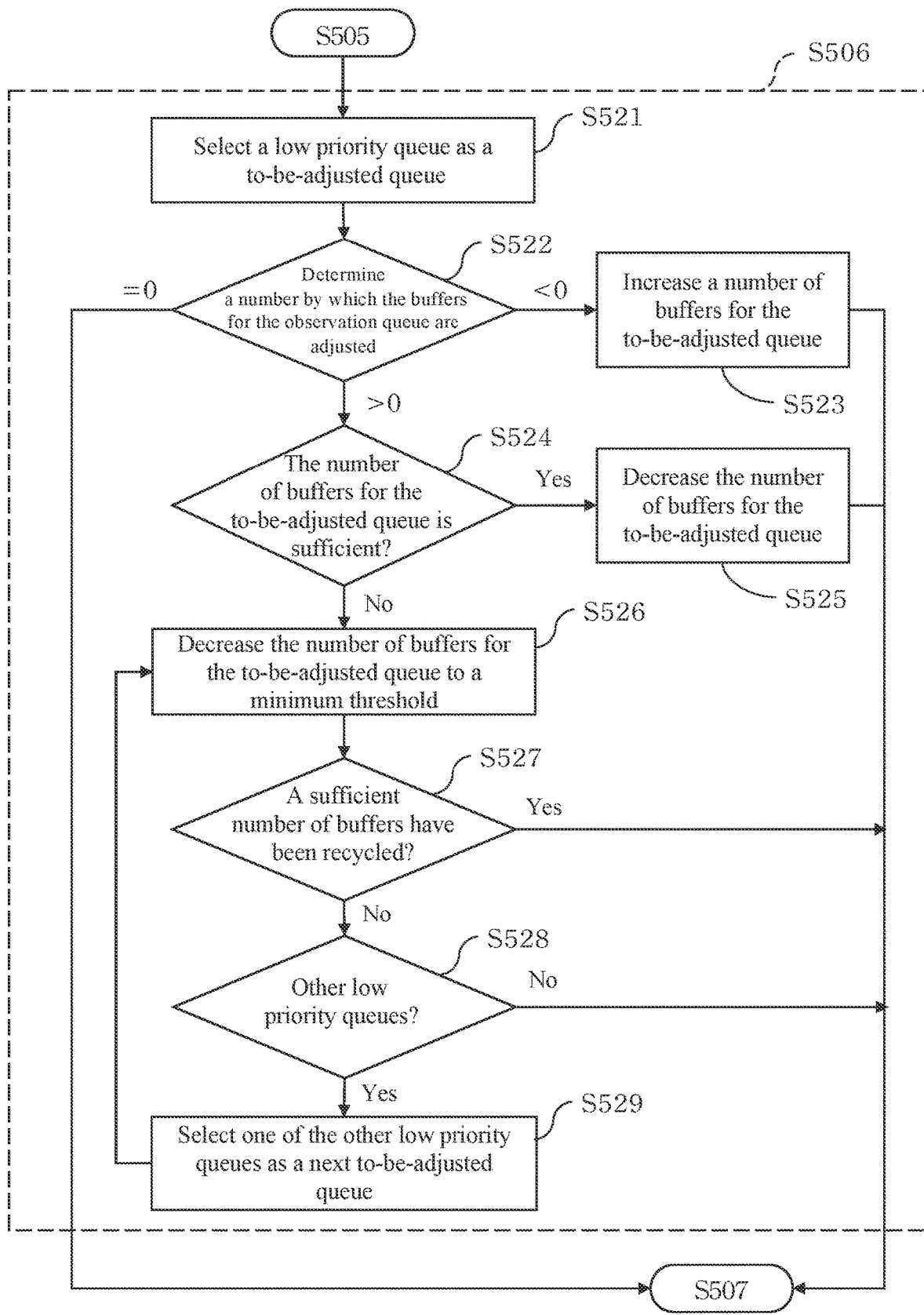
FIG. 5 is a detailed flowchart of step S506 in FIG. 3 according to an embodiment of the present invention.

Next, how to adjust the number of buffers 31 for the low priority queue is described. FIG. 5 is a detailed flowchart of step S506 in FIG. 3 according to an embodiment of the present invention. A number by which buffers 31 are decreased for one or more low priority queues is equivalent to the number by which buffers 31 are increased for the observation queue in the above step S505 herein. In step S521, one (which is referred to as "a to-be-adjusted queue") is first selected from the low priority queues. In some embodiments, the low priority queue is selected based on an order of transmission priorities. For example, the low priority queues are sequentially selected from the priority queue having the lowest priority to the priority queue which is one transmission priority lower than the observation queue, that is, one of the low priority queues which has a lowest transmission priority is preferentially selected as the to-be-adjusted queue. In other words, adjustment of the number of buffers 31 starts from the priority queue 33 of the one or more low priority queues which has a lowest transmission priority. For example, if the priority queue 33c is used as the observation queue, a number of buffers 31 is adjusted first for the priority queue 33h. In some embodiments, a priority queue 33 which is one transmission priority lower than the observation queue is preferentially selected (that is, one of the low priority queues which has a highest transmission priority is selected) as the to-be-adjusted queue. In other words, adjustment of the number of buffers 31 starts from the priority queue 33 of the one or more low priority queues which is one level lower than the observation queue. For example, if the priority queue 33c is used as the observation queue, a number of buffers 31 is adjusted first for the priority queue 33d.

In step S522, a number by which the buffers 31 are adjusted for the observation queue is determined.

If the buffers 31 are adjusted by zero for the observation queue, the number of buffers 31 does not need to be adjusted for the low priority queue (the to-be-adjusted queue), and the process directly proceeds to the above step S507.

If the buffers 31 are adjusted by a number less than zero (that is, the number is decreased) for the observation queue, the number of buffers 31 is increased for the to-be-adjusted queue (step S523). The buffers 31 are increased for the to-be-adjusted queue by a number equivalent to the number by which the buffers 31 are decreased for the observation queue in the above step S505. In this way, resources of buffers 31 that are not used by the observation queue can be shared with other priority queues 33.

If the buffers 31 are adjusted by a number greater than zero (that is, the number is increased) for the observation queue, it is determined whether the to-be-adjusted queue has sufficient buffers 31 for recycling (step S524). Specifically, each of the priority queues 33 has a minimum threshold of buffers 31. For example, the minimum threshold may be set to 1. In this case, at least one buffer 31 is reserved for the priority queue 33. Therefore, in step S524, it may be determined whether a number of buffers 31 except the minimum threshold of buffers 31 is greater than or equal to the number by which the buffers 31 are increased for the observation queue in the above step S505. If so, it means that the to-be-adjusted queue has sufficient buffers, and the process proceeds to step S525. If not, it means that the to-be-adjusted queue has insufficient buffers, and the process proceeds to step S526.

In step S525, the buffers 31 are decreased for the secondary priority queue by a number equivalent to the number by which the buffers 31 are increased for the observation queue in the above step S505. Then the process proceeds to the above step S507.

In step S526, the number of buffers 31 are decreased to the minimum threshold the secondary priority queue. The number by which the buffers 31 are decreased is merely sufficient for a portion of the number by which the buffers 31 are increased for the observation queue. Next, the process proceeds to step S527 to determine whether a sufficient number of buffers 31 have been recycled (that is, the number by which the buffers 31 are increased for the observation queue is observed). If so, the process proceeds to the above step S507. If not, it means that it is necessary to recycle buffers 31 from other low priority queues, and the process proceeds to step S528 to determine whether there are other low priority queues. If not, the process proceeds to the above step S507. If so, the process proceeds to step S529 to select one of the other low priority queues as a next to-be-adjusted queue. Then the process returns to step S526 and continues steps S526 to S529 until buffers 31 of a number equivalent to the number by which the buffers 31 are increased for the observation queue are recycled or buffers are recycled from all of the low priority queues.

In some embodiments, step S521 is performed after step S522. In other words, step S521 is performed between step S522 and step S523, and step S521 is performed between step S522 and step S524.

In some embodiments, the packet forwarding device is a network apparatus such as a gateway, a network modem, a router, a wireless network access point, or the like.

In some embodiments, the forwarding circuit 40 and the queue management circuit 50 may be implemented through a microprocessor, a complex programmable logic device (CPLD), a field-programmable gate array (FPGA), a logic circuit, an analog circuit, a digital circuit and/or any processing element based on operation instructions and operation signals (analog and/or digital signals).

In conclusion, the packet forwarding device and the queue management method provided in some embodiments of the present invention can dynamically adjust the number of buffers 31 for the queues in view of limited buffer memory resources, thereby providing an optimized throughput and optimized service quality. In some embodiments, when queue congestion is detected, a number of buffers 31 may be increased. In some embodiments, when fewer buffers 31 of a queue are used, a number of buffers may be decreased for the queue to allow more buffers 31 for other congested queues.

What is claimed is:

1. A packet forwarding device, comprising:
   at least one receiving port configured to receive a packet;
   at least one output port;
   a memory circuit comprising a free buffer pool and a plurality of priority queues associated with each of the at least one output port, and the plurality of priority queues associated with the same output port each have a different transmission priority;
   a forwarding circuit configured to selectively store the packet in a target queue of the priority queues, wherein the forwarding circuit is configured to drop the packet in response to the target queue being congested, and wherein the forwarding circuit is configured to store the packet in response to the target queue being not congested; and
   a queue management circuit configured to allocate at least one buffers from the free buffer pool to each priority queue associated with the at least one output port, the queue management circuit being further configured to select one of the plurality of priority queues as an observation queue and monitor a number of dropped packets of the observation queue and increase a number of buffers assigned from the free buffer pool to the observation queue in response to the number of dropped packets exceeding a predetermined threshold, and the queue management circuit being further configured to decrease the number of buffers assigned to the observation queue in response to the number of dropped packets being less than a second predetermined threshold, by reallocating the decreased number of buffers back to the free buffer pool.

2. The packet forwarding device according to claim 1, wherein the buffers for the observation queue are increased by a number equivalent to at least one times of the number of dropped packets.

3. The packet forwarding device according to claim 2, wherein the buffers for the observation queue are increased by a number equivalent to a number by which the buffers for the at least one of the plurality of the priority queues, other than the observation queue, are decreased.

4. The packet forwarding device according to claim 1, wherein the buffers for the observation queue are increased by a number equivalent to a number by which the buffers for the at least one of the plurality of priority queues, other than the observation queue, are decreased.

5. The packet forwarding device according to claim 1, wherein if the number of dropped packets of the observation queue is zero, the queue management circuit is configured to adjust the number of buffers for the observation queue according to a difference between a current number of buffers for the observation queue and a number of buffers from a previous monitored cycle.

6. The packet forwarding device according to claim 1, wherein the queue management circuit is configured to decrease the number of buffers starting from the priority queue which is one transmission priority lower than the observation queue and allocate the decreased buffers to the free buffer pool.

7. The packet forwarding device according to claim 1, wherein the queue management circuit is configured to decrease the number of buffers starting from the priority queue which has a lowest transmission priority and allocate the decreased buffers to the free buffer pool.

8. A queue management method, applicable to a plurality of priority queues associated with an output port, wherein each of the priority queues is associated with a different transmission priority, and the queue management method comprises:
   allocating at least one buffer from a free buffer pool to each of the priority queues;

selecting one of the plurality of priority queues as an observation queue;

monitoring a number of dropped packets of the observation queue; and increasing a number of buffers assigned from the free buffer pool to the observation queue in response to the number of dropped packets exceeding a predetermined threshold, and decreasing a number of buffers assigned to the observation queue in response to the number of dropped packets being less than a second predetermined threshold, by reallocating the decreased number of buffers back to the free buffer pool.

9. The queue management method according to claim 8, wherein the number of buffers for the at least one of the priority queues which has a lower transmission priority than the observation queue is decreased by an equal number of buffers as the increase to the observation queue.

10. The queue management method according to claim 8, wherein the buffers for the observation queue are increased by a number equivalent to at least one times of the number of dropped packets.

11. The queue management method according to claim 10, wherein the buffers for the observation queue are increased by a number equivalent to a number by which the buffers for the at least one of the priority queues are decreased.

12. The queue management method according to claim 8, wherein the buffers for the observation queue are increased by a number equivalent to a number by which the buffers for the at least one of the priority queues are decreased.

13. The queue management method according to claim 8, further comprising:

if the number of dropped packets of the observation queue is zero, adjusting the number of buffers for the observation queue according to a difference between a current number of buffers for the observation queue and a number of buffers from a previous monitored cycle.

14. The queue management method according to claim 8, wherein decreasing the number of buffers for the at least one of the priority queues which has a lower transmission priority than the observation queue starts from the priority queue which is one transmission priority lower than the observation queue.

15. The queue management method according to claim 8, wherein decreasing the number of buffers for the at least one of the priority queues which has a lower transmission priority than the observation queue starts from the priority queue which has a lowest transmission priority.

* * * * *